(12) United States Patent  (10) Patent No.: US 7,719,741 B2
Ueshima  (45) Date of Patent: May 18, 2010

(54) INPUT DEVICE (75) Inventor: Hiromu Ueshima, Shiga (JP)

(73) Assignee: SSD Company Limited, Shiga (JP)

( * ) Notice: Subject to any disclaimer, the term of this patent is extended or adjusted under 35 U.S.C. 154(b) by 94 days.

(21) Appl. No.: 11/573,724

(22) PCT Filed: Aug. 23, 2005

(86) PCT No.: PCT/JP2005/015600

§ 371 (c)(1),
(2), (4) Date: Feb. 15, 2007

(87) PCT Pub. No.: WO2006/022402

PCT Pub. Date: Mar. 2, 2006

(65) Prior Publication Data

US 2008/0094681 A1 Apr. 24, 2008

(30) Foreign Application Priority Data

Aug. 24, 2004 (JP) ............................ 2004-243076

(51) Int. Cl.
G02B 26/02 (2006.01)
G01N 21/86 (2006.01)
(52) U.S. Cl. ..................... 359/227; 359/530; 359/900; 250/559.29
(58) Field of Classification Search ........................ None
See application file for complete search history.

(56) References Cited

U.S. PATENT DOCUMENTS

| 5,231,539 | A | * | 7/1993 | McMillen | 359/529 |
| 6,111,563 | A | * | 8/2000 | Hines | 345/166 |
| 6,254,485 | B1 | | 7/2001 | Kanagawa et al. | |
| 6,324,024 | B1 | * | 11/2001 | Shirai et al. | 359/884 |
| 2003/0147651 | A1 | * | 8/2003 | Roes et al. | 398/108 |

FOREIGN PATENT DOCUMENTS

| EP | 1516654 A1 | 3/2005 |
| JP | 2000-61134 A | 2/2000 |
| JP | 2002-264651 A | 9/2002 |
| JP | 2004-85524 A | 3/2004 |
| WO | WO 2004/002593 A1 | 1/2004 |

OTHER PUBLICATIONS

International Search Report, Nov. 14, 2005 from International Phase of the instant application.

* cited by examiner

Primary Examiner—James Phan
(74) Attorney, Agent, or Firm—Jackson Patent Law Office (57) ABSTRACT The image sensor 15 of the information processing apparatus 1 can capture the retroreflective sheet 17 subjected to infrared light emitted from the infrared emitting diodes 11 since the retroreflective sheet 17 is exposed when the open-close portion 19 is opened. Therefore, it is possible to detect the input device 3. On the other hand, when the open-close portion 19 is closed, the image sensor 15 can not capture the retroreflective sheet 17 since the reflective sheet 17 is not exposed. Therefore, the input device is not detected.

13 Claims, 9 Drawing Sheets

INPUT DEVICE

TECHNICAL FIELD

The present invention is related to an input device comprising a reflective portion as an object which is captured by a stroboscope, and the related techniques thereof.

BACKGROUND ART

A golf game system of the present applicant is described in Jpn. unexamined patent publication No. 2004-85524. The golf game system includes a game apparatus and a golf club type input device, and an imaging unit including an image sensor and infrared emitting diodes is provided within a housing of the game apparatus. The infrared emitting diodes intermittently emit infrared light to a prescribed area above the imaging unit. Therefore, the image sensor intermittently picks up an image of a reflective portion attached to the golf club type input device which moves within the prescribed area. The speed of the golf club type input device which is an input to the game apparatus is calculated by processing images of the reflective portion captured by the stroboscope. In this way, input is given to a computer or a game apparatus in real time by means of the stroboscope.

DISCLOSURE OF INVENTION

It is an object of the present invention to provide an input device which comprises a reflective portion as an object captured by a stroboscope, can give input to an information processing apparatus in real time, and can be easily controlled to input or un-input, and the related techniques thereof.

In accordance with a first embodiment of the present invention, an input device as an object being captured by strobing, is operable to input to an information processing apparatus which performs processing in accordance with a program, and comprises: a retroreflective member; a unit where said retroreflective member is attached; and a supporting body where said unit is attached rotatably, and wherein said retroreflective member is attached on a predetermined face of said unit and a direction which the predetermined face faces is different in response to rotating of said unit.

In accordance with this configuration, an operator can easily control input/un-input to the information processing apparatus since it is possible to control the direction which the retroreflective member faces only by rotating the unit where the retroreflective member is attached.

In accordance with a second embodiment of the present invention, an input device as an object being captured by strobing, is operable to input to an information processing apparatus which performs processing in accordance with a program, and comprises: a retroreflective member; a unit where said retroreflective member is attached; and a supporting body where said unit is attached so as to be opened and closed, and wherein said retroreflective member is attached to said unit in a manner that said retroreflective member is located between said unit and said supporting body when said unit is either closed or opened.

In accordance with this configuration, an operator can easily control input/un-input to the information processing apparatus since it is possible to control exposure of the retroreflective member only by opening/closing the unit where the retroreflective member is attached.

In accordance with a third embodiment of the present invention, an input device as an object being captured by strobing, is operable to input to an information processing apparatus which performs processing in accordance with a program, and comprises: a retroreflective member; a shutter which exposes said retroreflective member when said shutter is opened and does not expose said retroreflective member when said shutter is closed.

In accordance with this configuration, an operator can easily control input/un-input to the information processing apparatus since it is possible to control exposure of the retroreflective member only by opening/closing the shutter.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein.

BEST MODE FOR CARRYING OUT THE INVENTION

In what follows, an embodiment of the present invention will be explained in conjunction with the accompanying drawings. Meanwhile, like references indicate the same or functionally similar elements throughout the respective drawings, and therefore redundant explanation is not repeated.

Figure 1:
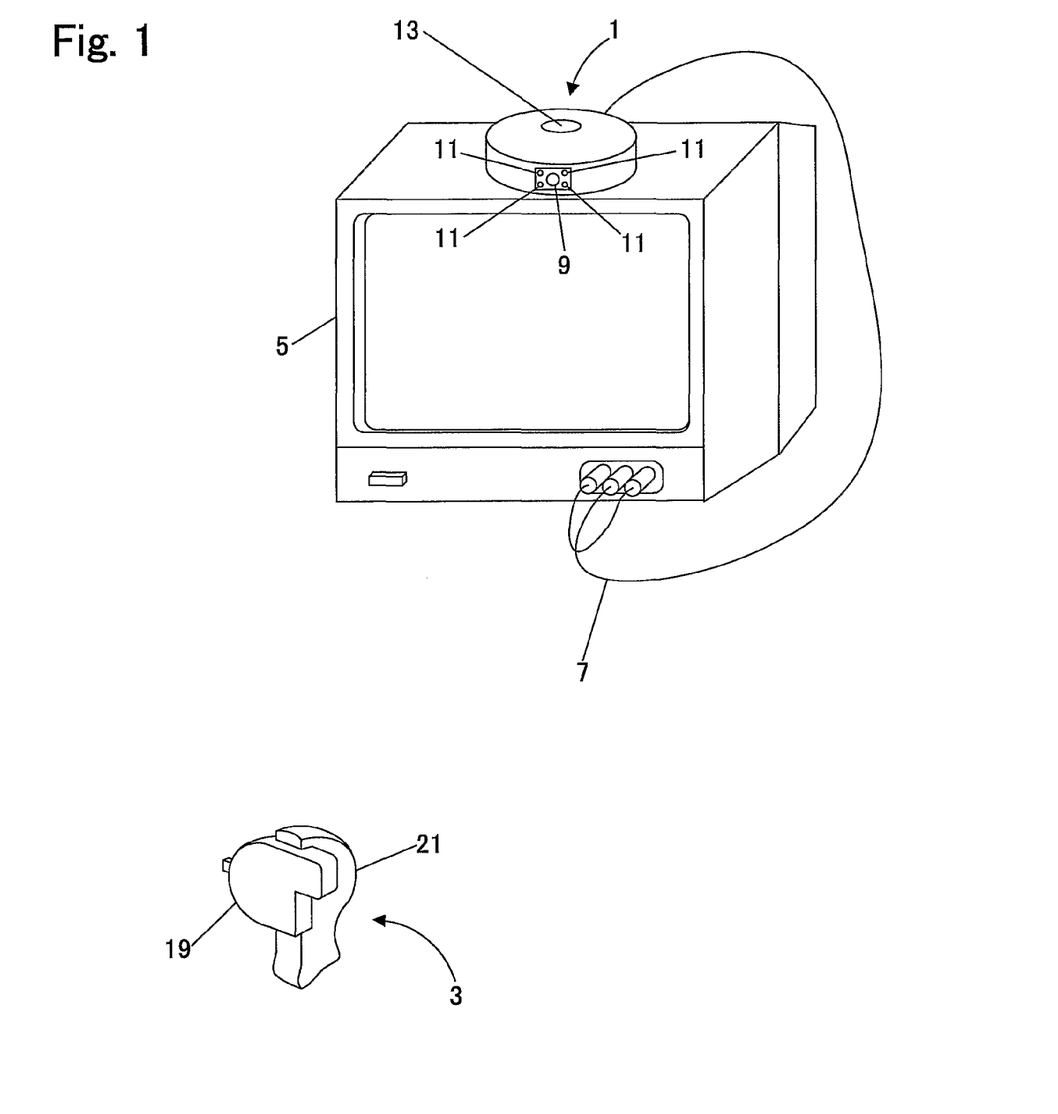
FIG. 1 is a view showing the overall configuration of an information processing system in accordance with the embodiment of the present invention.

FIG. 1 is a view showing the overall configuration of an information processing system in accordance with the embodiment of the present invention. As illustrated in FIG. 1, this information processing system includes an information processing apparatus 1, an input device 3 and a television monitor 5.

The information processing apparatus 1 is connected to the television monitor 5 with an AV cable 7. A DC power voltage is supplied to the information processing apparatus 1 through an AC adapter or a battery (not shown). A power switch 13 is provided on the upper surface of the information processing apparatus 1.

The information processing apparatus 1 is also provided with an infrared filter 9 which transmits only infrared light, and four infrared emitting diodes 11 which emit infrared light are positioned around the infrared filter 9 and exposed. An image sensor 15 to be explained later is positioned behind the infrared filter 9.

The four infrared emitting diodes 11 intermittently emit infrared light. Then, the infrared light emitted from the infrared emitting diodes 11 is reflected by the retroreflective sheet 17 (to be explained later) attached on the input device 3, and input to the image sensor 15 located behind the infrared filter 9. In this way, the input device 3 is captured by the image sensor 15. Even though infrared light is emitted intermittently, the image sensor 15 also performs imaging process during non-lighted period of infrared light. The information processing apparatus 1 obtains a differential signal between image signals of the input device 3 moved by an operator with and without lighted, and calculates position of the input device 3 (i.e., the retroreflective sheet 17) on the basis of the differential signal.

Figure 2A:
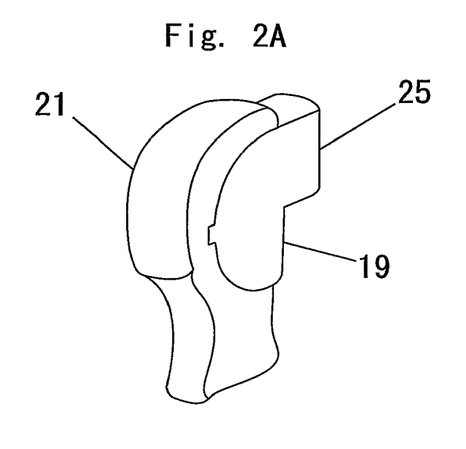
FIG. 2A is a perspective view showing the input device 3 of FIG. 1 when an open-close portion 19 is closed.
Figure 2B:
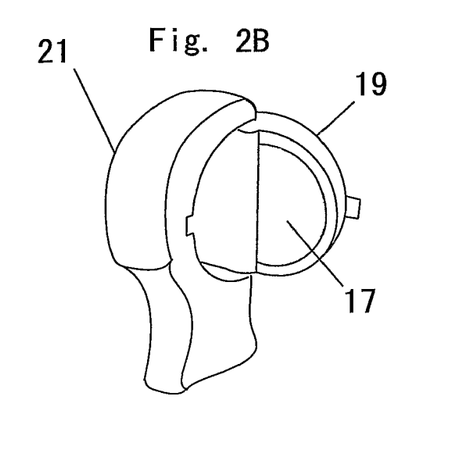
FIG. 2B is a perspective view showing the input device 3 of FIG. 1 when the open-close portion 19 is opened.
Figure 3A:
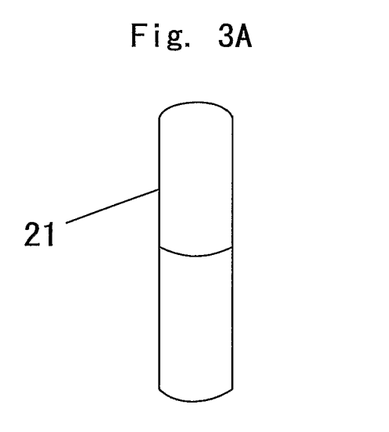
FIG. 3A is a front view showing the input device 3 of FIG. 1 when the open-close portion 19 is closed.
Figure 3B:
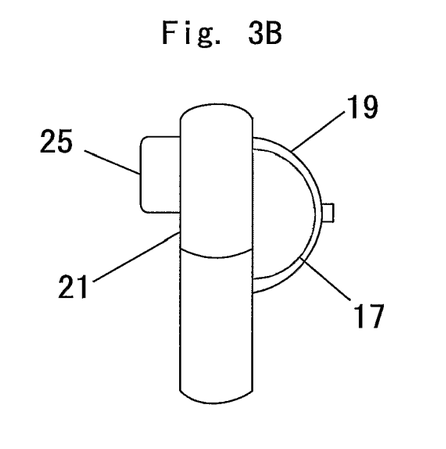
FIG. 3B is a front view showing the input device 3 of FIG. 1 when the open-close portion 19 is opened.
Figure 4A:
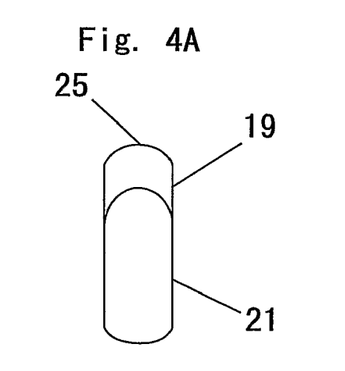
FIG. 4A is a plan view showing the input device 3 of FIG. 1 when the open-close portion 19 is closed.
Figure 4B:
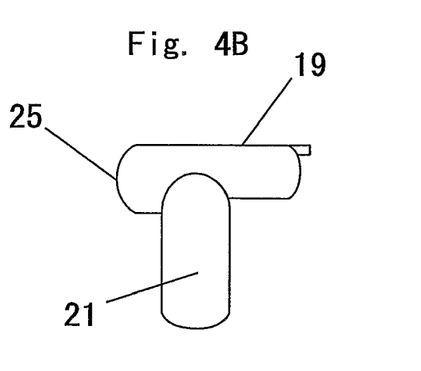
FIG. 4B is a plan view showing the input device 3 of FIG. 1 when the open-close portion 19 is opened.
Figure 5:
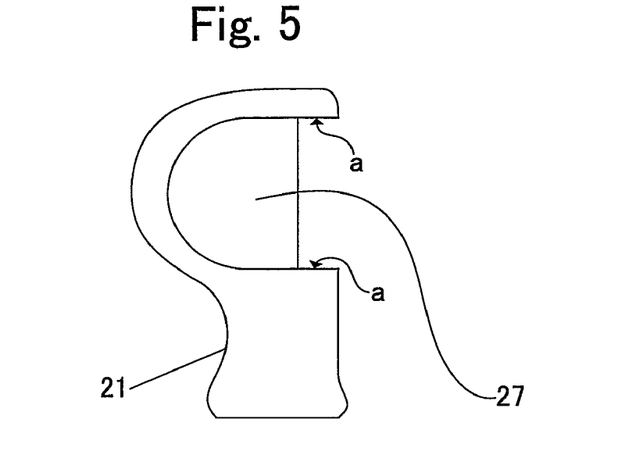
FIG. 5 is a side view showing a supporting portion 21 of the input device 3 of FIG. 1.
Figure 6:
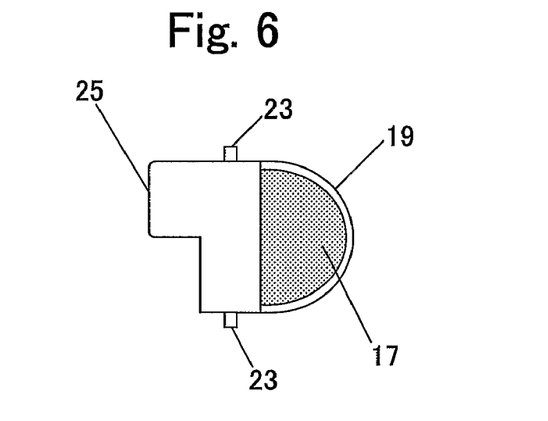
FIG. 6 is a side view showing the open-close portion 19 of the input device of FIG. 1.
Figure 7:
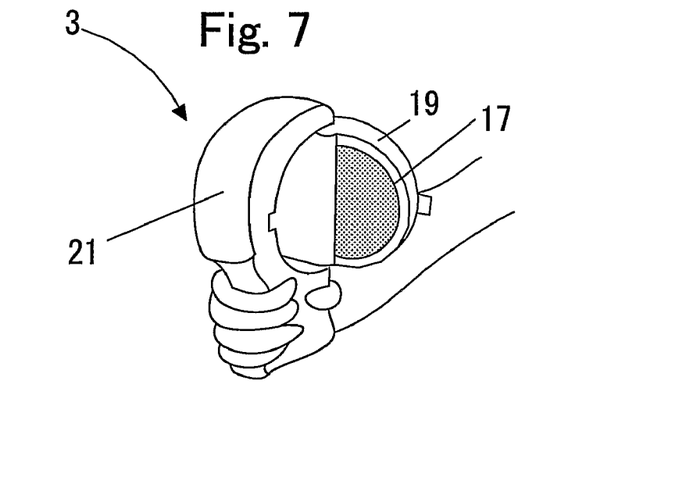
FIG. 7 is a view showing the input device 3 of FIG. 1 being held by an operator with a right hand.

FIG. 2A is a perspective view showing the input device 3 of FIG. 1 when an open-close portion 19 is closed, and FIG. 2B is a perspective view showing the input device 3 of FIG. 1 when the open-close portion 19 is opened. FIG. 3A is a front view showing the input device 3 of FIG. 1 when the open-close portion 19 is closed, and FIG. 3B is a front view showing the input device 3 of FIG. 1 when the open-close portion 19 is opened. FIG. 4A is a plan view showing the input device 3 of FIG. 1 when the open-close portion 19 is closed, and FIG. 4B is a plan view showing the input device 3 of FIG. 1 when the open-close portion 19 is opened. FIG. 5 is a side view showing a supporting portion 21 of the input device 3 of FIG. 1. FIG. 6 is a side view showing the open-close portion 19 of the input device of FIG. 1. FIG. 7 is a view showing the input device 3 of FIG. 1 being held by an operator with a right hand.

As illustrated in these figures, the input device 3 includes the open-close portion 19 and the supporting portion 21. The upper half of the supporting portion 21 is referred as a head, and the lower half is referred as a grip. The open-close portion 19 is attached to the head of the supporting portion 21 so as to be freely opened and closed.

As illustrated in FIG. 6, a semicircular retroreflective sheet 17 is attached on one side of the open-close portion 19. Namely, the open-close portion 19 is a unit where the retroreflective sheet 17 is attached. Cylindrical salient portions 23 are formed on the same axis as a rotary shaft on the upper surface and the lower surface of the open-close portion 19. In addition, a lever portion is formed in a manner to project toward the opposite side of the retroreflective sheet 17 from near the salient portion 23 on the upper surface of the open-close portion 19. Incidentally, the lever portion 25 is referred as a tale of the open-close portion 19, and the opposite side of the lever portion 25 across the rotary shaft (i.e., a substantially semicircularly cylindrical portion where the retroreflective sheet 17 is attached) is sometimes referred as a head of the open-close portion 19.

In addition, as illustrated in FIG. 5, a substantially semicircularly cylindrical concave portion 27 is formed on one side of the head of the supporting portion 21 so that the head of the open-close portion 19 can fit in. Axial holes (not shown) to insert the salient portions 23 are formed on both ends (indicated by arrows "a") of the inner wall of the concave portion 27.

Then, the salient portions 23 of the open-close portion 19 are inserted to the respective axial holes formed on the both end of the inner wall of the concave portions 27, and the input device 3 is finally completed. In this way, the open-close portion 19 is attached to the supporting portion 21 so as to be freely rotated by using the salient portions 23 as the rotary shaft.

When an operator, for example, holds the input device 3 with a right hand and rotates the lever portion 25 of the open-close portion 19 which is closed (refer to FIGS. 2A, 3A and 4A) with a right thumb, the open-close portion 19 opens (refer to FIGS. 7, 2B, 3B and 4B). Also, when an operator, for example, holds the input device 3 with a right hand and rotates, in the reverse direction, the lever portion 25 of the open-close portion 19 which is opened with a right thumb, the open-close portion 19 closes in a manner that fits into the concave portion 27.

When the operator turns the retroreflective sheet 17 of the open-close portion 19 which is opened toward the infrared filter 9 (i.e., the image sensor 15) of the information processing apparatus 1, the image sensor 15 picks up an image of the retroreflective sheet 17 subjected to the infrared light emitted from the infrared emitting diodes 11 so that the information processing apparatus 1 can detect the input device. On the other hand, even if the operator turns the input device 3 with the open-close portion 19 being closed toward the infrared filter 9 of the information processing apparatus 1, the retroreflective sheet 17 is not captured since the reflective sheet 17 is hidden in the concave portion 27 of the supporting portion 21 so it can not be subjected to the infrared light. Therefore, the information processing apparatus 1 determines the input device does not exist.

As has been discussed above, it is possible to control easily to input or un-input to the information processing apparatus 1 by controlling open/close operation of the input device 3. Incidentally, the information processing apparatus 1 determines that there is input when the input device 3 is detected; the information processing apparatus 1 determines that there is not an input when the input device 3 is not detected; and vice versa.

Figure 8:
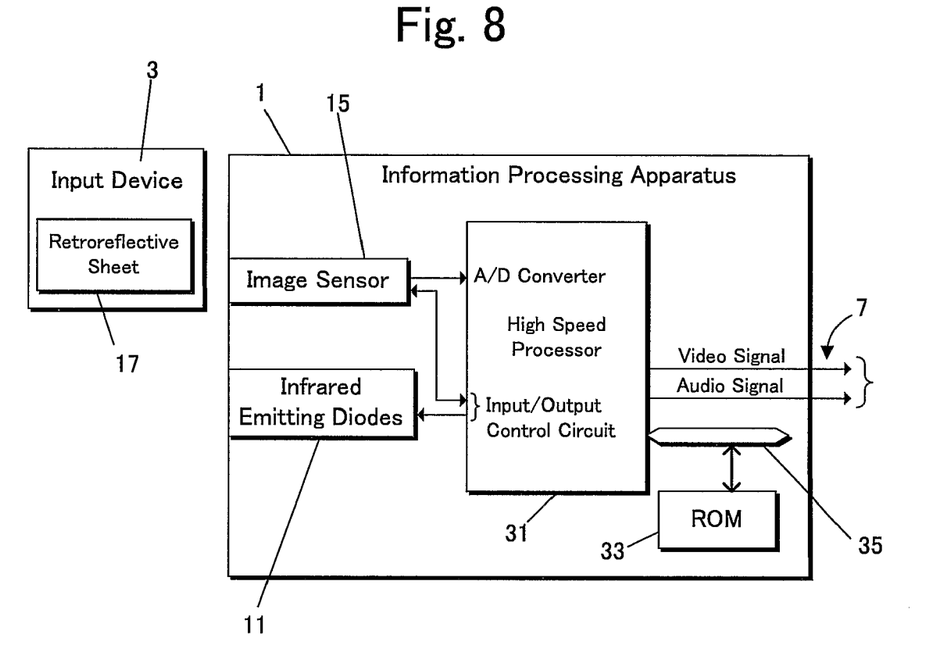
FIG. 8 is a view showing the electrical construction of the information processing apparatus 1 of FIG. 1.

FIG. 8 is a view showing the electrical construction of the information processing apparatus 1 of FIG. 1. As illustrated in FIG. 8, the information processing apparatus 1 includes the image sensor 15, the infrared emitting diodes 11, a high speed processor 31, a ROM (read only memory) 33, and a bus 35.

The input device 3 with the open-close portion 19 opened is irradiated by infrared light emitted from the infrared emitting diodes 11 and reflects the infrared light with the retroreflective sheet 17. The infrared light reflected by the retroreflective sheet 17 is captured by the image sensor 15. Therefore, an image signal of the retroreflective sheet 17 is output from the image sensor 15. The analog image signal from the image sensor 15 is converted to a digital data by an A/D converter (not shown) of the high speed processor 31. Incidentally, the high speed processor 31 makes the infrared emitting diodes 11 flash intermittently to perform strobing.

The high speed processor 31, even though not shown in figures, also includes various function blocks such as a CPU (central processing unit), a graphics processor, a sound processor and a DMA controller; the A/D converter which is used when an analog signal is input; and an input/output control circuit which receives input signals such as a key operation signal and an infrared signal and transmits output signals to external devices. Input signals are transmitted to the CPU. The CPU performs necessary calculations in response to the input signals and gives the results to the graphics processor and the sound processor. Therefore, the graphics processor and the sound processor perform image processing and sound processing in accordance with the results of the calculation.

In addition, the high speed processor 31 includes an internal memory (not shown) which, for example, consists of a RAM (random access memory). The internal memory is utilized as a working area, a counter area, a temporary area and/or a flag area.

The high speed processor 31 can access the ROM 33 through the bus 35. Therefore, the high speed processor 31 can execute a program stored in the ROM 33, and read and process data stored in the ROM 33. A program, image data, sound data and so on are stored in the ROM 33 in advance.

The high speed processor 31 processes digital image signals input from the image sensor 15 via the A/D converter, and detects whether or not there is input from the input device 3 and position of the input device 3. Then, the high speed processor 31 performs calculation, graphic processing, and sound processing, and then outputs a video signal and an audio signal. The video signal and the audio signal are given to the television monitor 5 via the AV cable 7. Consequently, an image is displayed on the television monitor 5 and a sound is output from a speaker (not shown).

Figure 9:
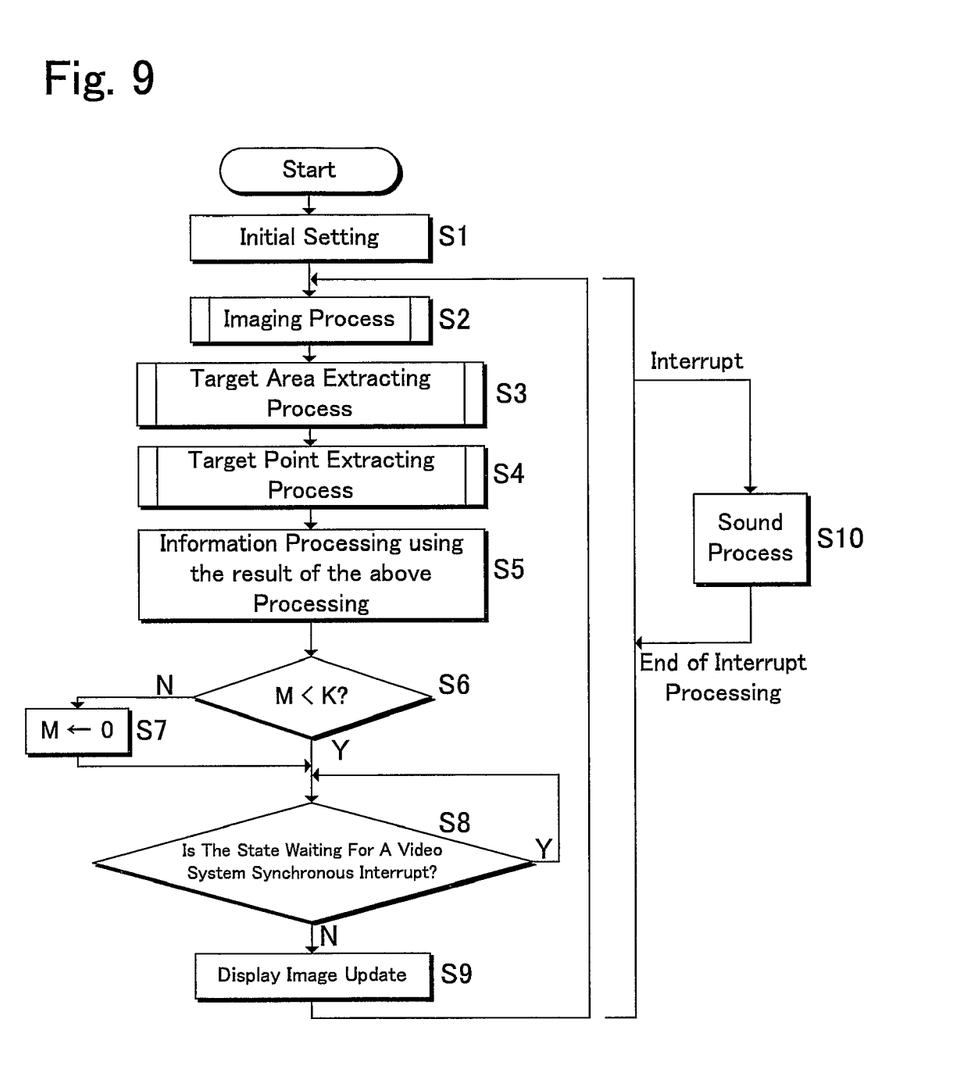
FIG. 9 is a flowchart showing the entire operation of the information processing apparatus 1 of FIG. 1.

FIG. 9 is a flowchart showing the entire operation of the information processing apparatus 1 of FIG. 1. As illustrated in FIG. 9, the high speed processor 31 performs the initial setting of the system in step S1. In step S2, the high speed processor 31 activates the infrared emitting diodes 11 and performs imaging processing of the input device 3.

In step S3, the high speed processor 31 performs extracting process of a target area of the input device 3. In step S4, the high speed processor 31 extracts a target point of the input device 3. In step S5, the high speed processor 31 performs information processing using the results of the processing of step S3 and S4.

In step S6, the high speed processor 31 judges whether or not a variable "M" is smaller than a predetermined value "K". If the variable "M" is equal to or larger than the predetermined value "K", the high speed processor 31 proceeds to step S7, assigns "0" to the variable "M", and then proceeds to step S8. On the other hand, if the variable "M" is smaller than the predetermined value "K", the high speed processor 31 proceeds from step S6 to step S8.

If it is "Yes" in step S8, i.e., the high speed processor 31 waits for the video system synchronous interrupt (i.e., as long as the video system synchronous interrupt is not issued), the high speed processor 31 returns to the same step S8. On the other hand, if it is "No" in step S8, i.e., the high speed processor 31 gets out of the state of waiting for the video system synchronous interrupt (i.e., if the high speed processor 31 is given the video system synchronous interrupt), the high speed processor 31 proceeds to step S9. In step S9, the high speed processor 31 performs update processing of the screen image displayed on the television monitor 5 and then proceeds to step S2.

The sound processing in step S10 is performed when there is a sound interrupt, and consequently music and sound effects are output.

Figure 10:
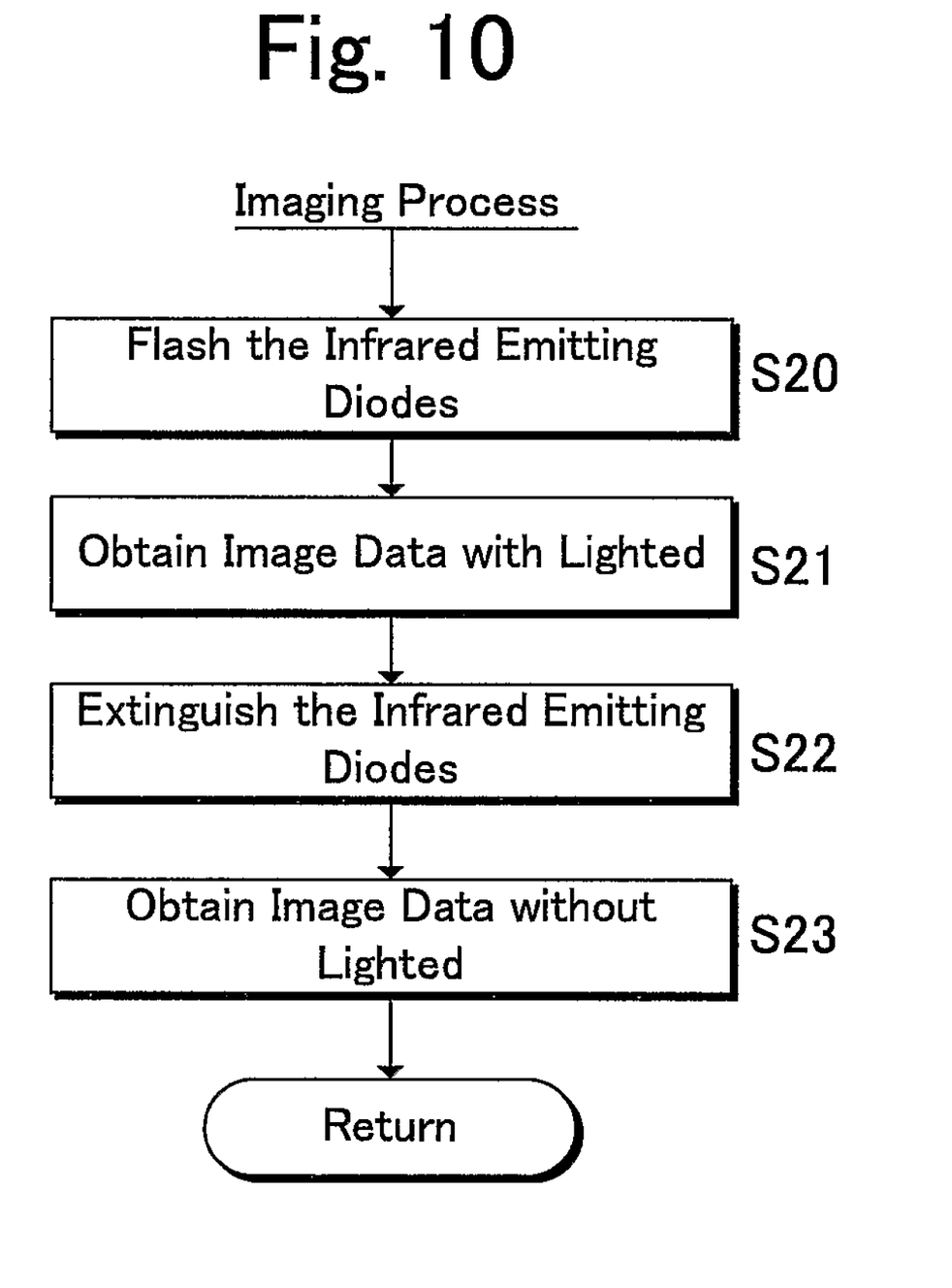
FIG. 10 is a flowchart showing the process flow of imaging process in step S2 of FIG. 9.

FIG. 10 is a flowchart showing the process flow of imaging process in step S2 of FIG. 9. As illustrated in FIG. 10, the high speed processor 31 makes the infrared emitting diodes 11 flash to perform strobing in step S20. In step S21, the high speed processor 31 obtains, from the image sensor 15, image data with lighted and stores it in the internal memory.

In this embodiment, the CMOS image sensor which consists of 32 pixels×32 pixels is used as an example of the image sensor 43. The horizontal direction is a direction of X axis and the vertical direction is a direction of Y axis. Therefore, 32 pixels×32 pixels of pixel data (luminance data for each pixel) is output as an image data from the image sensor 15. This pixel data is converted to digital data by the A/D converter, and stored in an array P1[X][Y] in the internal memory.

In step S22, the high speed processor 31 makes the infrared diodes 11 un-flash. In step S23, the high speed processor 31 obtains, from the image sensor 15, image data without lighted (32 pixels×32 pixels of pixel data (luminance data for each pixel)), and stores it in the internal memory. In this case, the image data without lighted is stored in an array P2[X][Y] in the internal memory.

Incidentally, since 32×32 pixel image sensor 15 is used in this embodiment, X=0 to 31, Y=0 to 31, and a corner on upper left is defined as an origin.

Figure 11:
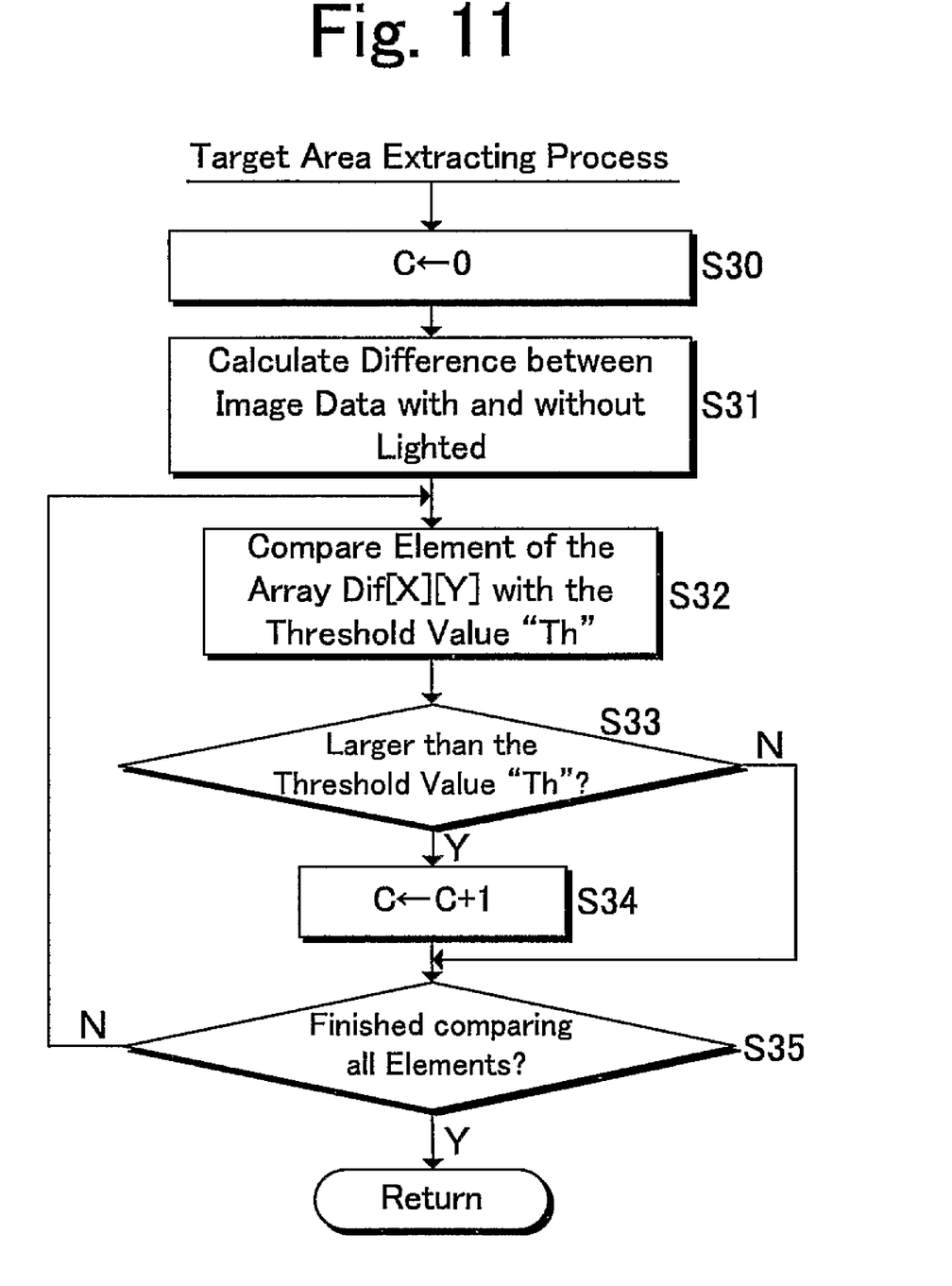
FIG. 11 is a flowchart showing the process flow of target area extracting process in step S3 of FIG. 9.

FIG. 11 is a flowchart showing the process flow of target area extracting process in step S3 of FIG. 9. As illustrated in FIG. 11, the high speed processor 31 assigns "0" to a counter "C" in step S30. In step S31, the high speed processor 31 calculates difference between pixel data P1[X][Y] with light emitted from the infrared emitting diodes 11 and pixel data P2[X][Y] without light emitted from the infrared emitting diodes 11. The difference data is assigned to an array Dif[X][Y].

In this way, it is possible to eliminate light (or noise) except return light from the retroreflective sheet 17 as much as possible by obtaining the difference data so that it is possible to detect the retroreflective sheet 17 with high accuracy.

In step S32, the high speed processor 31 compares an element of the array Dif[X][Y] with a predetermined threshold "Th". In step S33, if the the element of the array Dif[X][Y] is larger than the predetermined threshold "Th", the high speed processor 31 proceeds to step S34, otherwise proceeds to step S35.

In step S34, the high speed processor 31 increments the count value "C" by one to count the number of the difference data (the elements of the array Dif[X][Y]) exceeding the predetermined threshold value "Th". The high speed processor 31 repeats the process from step S32 to S34 until the high speed processor 31 finishes comparing all elements of the array Dif[X][Y] with the predetermined threshold value "Th" (in step S35). The final count value "C" is the size of the target area of the input device 3.

Figure 12:
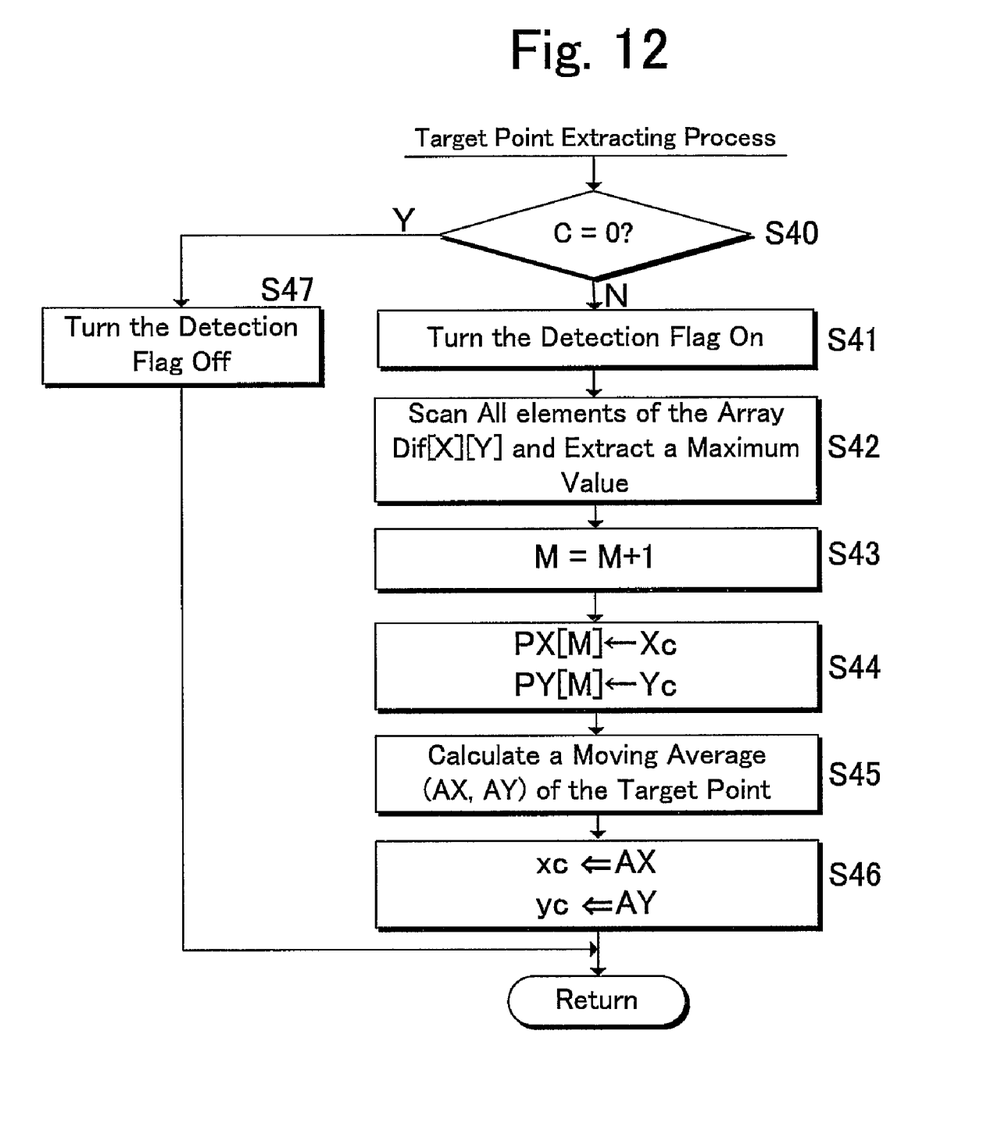
FIG. 12 is a flowchart showing the process flow of the target point extracting process in step S4 of FIG. 9.

FIG. 12 is a flowchart showing the process flow of the target point extracting process in step S4 of FIG. 9. As illustrated in FIG. 12, the high speed processor 31 determines whether or not the count value "C" (refer to step S34 of FIG. 11) is "0" in step S40. If the count value "C" is "0", the high speed processor 31 proceeds to step S47, otherwise proceeds to step S41.

Incidentally, if the count value "C" is "0", it means the retroreflective sheet 17 of the input device 3 is not detected, i.e., the open-close portion 19 of the input device 3 is closed (for example, there is no input). If the count value "C" is not "0", it means the retroreflective sheet 17 of the input device 3 is detected, i.e., the open-close portion 19 of the input device 3 is opened (for example, there is input).

In step S47, the high speed processor 31 turns off a detection flag which indicates whether or not the input device 3 is detected. On the other hand, the high speed processor 31 turns the detection flag on in step S41.

In step S42, the high speed processor 31 scans all elements of the array Dif[X][Y] and detects a maximum value. The X coordinate and the Y coordinate of the maximum value is defined as the coordinate (Xc, Yc) of the target point. In step S43, the high speed processor 31 increments the variable "M" by one.

In step S44, the high speed processor 31 assigns the coordinates "Xc" and "Yc" to an array PX[M] and PY[M]. In step S45, the high speed processor 31 calculates a moving average (AX, AY) of the target point (Xc, Yc) of the input device 3. In step S46, the high speed processor 31 converts the average coordinate (AX, AY) of the target point on the image sensor 15 into a coordinate (xc, yc) on the television monitor 5.

Returning to FIG. 9, the high speed processor 31 performs various processing on the basis of the coordinate (xc, yc) of the target point and in response to input/un-input from the input device 3 in reference to the detection flag.

Figure 13A:
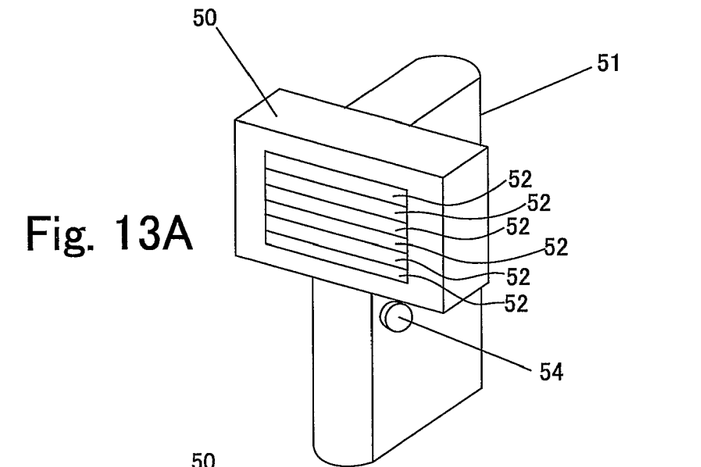
FIG. 13A is a perspective view showing other example of the input device 3 when its shutter is closed.
Figure 13B:
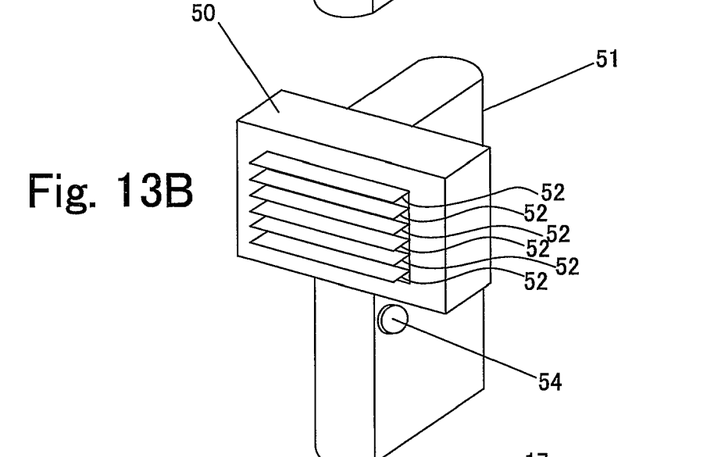
FIG. 13B is a perspective view showing the input device 3 of FIG. 13A when its shutter is opened.

FIG. 13A is a perspective view showing other example of the input device 3 when its shutter is closed; FIG. 13B is a perspective view showing the input device 3 of FIG. 13A when its shutter is opened; and FIG. 13C is a front view showing the input device 3 of FIG. 13A when its shutter is opened.

As illustrated in these drawings, the input device 3 includes a head portion 50 and a body portion 51. The head portion 50 is attached on the front side of upper part of the body portion 51. Incidentally, the lower part of the body portion 51 is a grip where an operator holds.

Figure 13C:
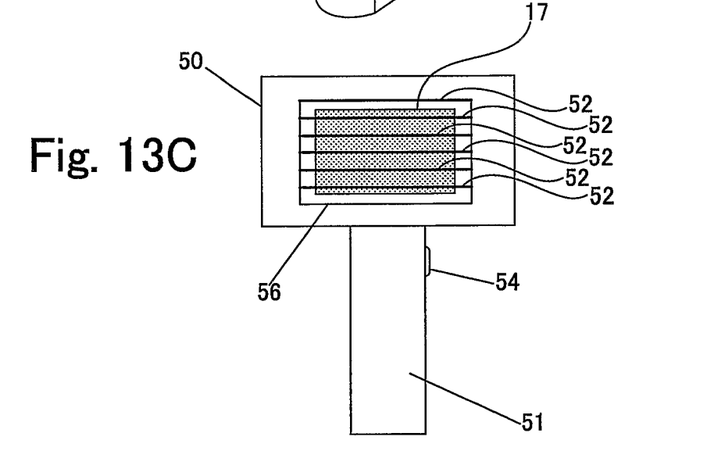
FIG. 13C is a front view showing the input device 3 of FIG. 13A when its shutter is opened.

As illustrated in FIG. 13C, a rectangular aperture 56 is formed on the head portion 50, and the retroreflective sheet 17 is attached on the bottom part of the aperture 56.

When a button 54 of the body portion 51 is not pressed, a plurality of slats 52 are closed. Therefore the retroreflective sheet 17 is not exposed since the aperture 56 is covered with the slats 52 (refer to FIG. 13A). On the other hand, when the button 54 of the body portion 51 is pressed, the slats are opened (refer to FIGS. 13B and 13C). Therefore, the retroreflective sheet 17 is exposed from the aperture 56.

When an operator turns the retroreflective sheet 17 with the slats 52 opened toward the infrared filter 9 (i.e., the image sensor 15) of the information processing apparatus 1, the retroreflective sheet 17 subjected to the infrared light from the infrared emitting diodes 11 is captured by the image sensor 15 so that the information processing apparatus 1 can detect the input device 3. On the other hand, when an operator turns the input device 3 with the slats 52 closed toward the infrared filter 9 of the information processing apparatus 1, the retroreflective sheet 17 is not captured since the retroreflective sheet 17 is covered with the slats 52 and not exposed to infrared light. Therefore, the information processing apparatus 1 determines the input device does not exist.

As has been discussed above, it is possible to control exposure of the retroreflective sheet 17 by opening/closing the shutter which is made of a plurality of the slats 52. Therefore, to control input/un-input to the information processing apparatus 1, the operator simply opens and closes the slats 52. Incidentally, if the input device 3 is detected, it is considered to be there is input in the same way as the input device 3 of FIG. 1, and if the input device 3 is not detected, it is considered to be there is not input from the input device 3, and vice versa.

Incidentally, the present invention is not limited to the above embodiment, and a variety of variations and modifications maybe effected without departing from the spirit and scope thereof, as described in the following exemplary modifications.

(1) The open-close portion 19 is rotated around the vertical shaft in FIGS. 2A and 2B. However, for example, it can be rotated around a horizontal shaft, and also it is possible to decide the direction of the rotation arbitrarily. In addition, the contours of the open-close portion 19 and the supporting portion 21 are not limited thereto, and the shape of the retroreflective sheet 17 can be made arbitrarily. In above description, the open-close portion 19 is opened/closed by hand. However, the open-close portion 19 can be opened/closed for example, by pressing a button.

(2) In FIG. 13A to 13C, the exposure of the retroreflective sheet 17 is controlled by the shutter which is made of the plurality of slats 52. However, it is not limited thereto, and the exposure of the retroreflective sheet 17 can be controlled by one plate which covers the aperture 56. In this case, the shutter can be opened/closed by sliding the plate vertically or horizontally, rotating on one point on the plate, or rotating around one side line of the plate as a shaft. The contours of the aperture 56 and the retroreflective sheet 17 are not limited to rectangular. They can be made any arbitrary shape. Needless to say, the contours of the head portion 50 and the body portion 51 are not limited thereto, and they can be made any arbitrary shape. In above explanation, the retroreflective sheet 17 is attached on the bottom of the aperture 56. However, instead of forming the aperture 56 on the surface of the head portion 50, it is possible to make the surface of the head portion 50 flat and attach the retroreflective sheet 17 on the surface.

(3) For the method of controlling exposure of the retroreflective sheet 17, a lens shutter mechanism used in a compact camera or a focal plane shutter mechanism used in a single-lens reflex camera can be employed. Also, an aperture mechanism of camera using aperture blades can be employed. Furthermore, a liquid-crystal shutter can be used as the method of controlling exposure of the retroreflective sheet 17.

(4) In above explanation, if a difference data corresponding to at least one pixel is larger than the threshold value "Th", the high speed processor 31 determines that the input device 3 is detected (refer to step S41 of FIG. 12). However, in addition to the condition explained above, it is possible to use a condition which the count value "C" (corresponding to the area of the target area) is larger than the prescribed value as a condition for detecting the input device 3.

(5) In the input device 3 of FIG. 1, input/un-input to the information processing apparatus 1 is controlled by opening/closing operation of the open-close portion 19. In above explanation, the term "open-close" is used. However, it is possible to turn the reflective sheet 17 toward the image sensor 15 or toward the opposite direction of the image sensor 15 to control input/un-input to the information processing apparatus 1 by rotating the open-close portion 19 (i.e., the member where the reflective sheet 17 is attached) around a shaft.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

The invention claimed is:

1. An input device operable with a system including a detector that conditionally detects the input device, the detector including a light sensor and a processor, the light sensor including a plurality of pixels in a first dimension, and a plurality of pixels in a second dimension perpendicular to the first dimension, the processor that detects the input device by processing the plurality of pixels received from the light sensor to determine a first coordinate of the input device, the first coordinate corresponding to a position on a first axis, the first axis defining the first dimension, and determine a second coordinate of the input device, the second coordinate corresponding to a position on a second axis, the second axis defining the second dimension and being perpendicular to the first axis, the input device comprising:
   an operation portion,
   a retroreflective member, and
   a shutter configured to move from an open position to a closed position, responsive to operation of the operation portion by a person, to disable the light sensor from receiving light from the retroreflective member, to disable the processor from determining the first and second coordinates of the input device, and configured to move from the closed position to the open position, responsive to operation of the operation portion by the person, to enable the light sensor to receive light from the retroreflective member, to enable the processor to determine the first and second coordinates of the input device.

2. The input device of claim 1 wherein the retroreflective member defines a major surface, and the shutter extends across the major surface when the shutter is in the open position, and the shutter extends across the major surface when the shutter is in the closed position.

3. The input device of claim 1 wherein the retroreflective member includes a retroreflective sheet.

4. A system comprising:
   a detector;
   an input device including
      an operation portion,
      a retroreflective member, and
      a shutter configured to move from an open position to a closed position responsive to operation of the operation portion by a person, to disable the detector from detecting the retroreflective member, and configured to move from the closed position to the open position responsive to operation of the operation portion by the person, to enable the detector to detect the retroreflective member,
   wherein the detector detects the input device depending on whether the shutter is in the open position, the detector including
      a light sensor including a plurality of pixels arranged along a first dimension, and a plurality of pixels arranged along a second dimension perpendicular to the first dimension, and
      a processor that detects the input device by processing signals received from the light sensor to determine a first coordinate of the input device, the first coordinate corresponding to a position on a first axis, the first axis corresponding to the first dimension, and determine a second coordinate of the input device, the second coordinate corresponding to a position on a second axis, the second axis corresponding to the second dimension.

5. The system of claim 4 wherein the retroreflective member defines a major surface, and the shutter extends across the major surface when the shutter is in the open position, and the shutter extends across the major surface when the shutter is in the closed position.

6. The system of claim 4 wherein the retroreflective member includes a retroreflective sheet.

7. The system of claim 4 wherein the detector is configured to operate by receiving a first signal at a time when a light source is activated, receiving a second signal at a time when the light source is not activated, and generating a third signal in accordance with a difference between the first and second signals.

8. The system of claim 4 further including a signal generator that generates a video signal in accordance with an output of the detector, and supplies the video signal to a display device.

9. A method of operating with a light sensor including a plurality of pixels arranged along a first dimension, and a plurality of pixels arranged along a second dimension perpendicular to the first dimension, and with an input device including an operation portion, a retroreflective member, and a shutter, the method comprising:
   moving the shutter from an open position to a closed position responsive to operation of the operation portion by a person, to disable a detector from detecting the retroreflective member, and
   moving the shutter from the closed position to the open position responsive to operation of the operation portion by the person, to enable the detector to detect the retroreflective member; and
   detecting the input device depending on whether the shutter is in the open position, by
      receiving signals from the light sensor to determine a first coordinate of the input device, the first coordinate corresponding to a position on a first axis, the first axis corresponding to the first dimension, and determine a second coordinate of the input device, the second coordinate corresponding to a position on a second axis, the second axis corresponding to the second dimension.

10. The method claim 9 wherein the retroreflective member defines a major surface, and the shutter extends across the major surface when the shutter is in the open position, and the shutter extends across the major surface when the shutter is in the closed position.

11. The method of claim 9 wherein the retroreflective member includes a retroreflective sheet.

12. The method of claim 9 wherein detecting includes receiving a first signal at a time when a light source is activated, receiving a second signal at a time when the light source is not activated, and generating a third signal in accordance with a difference between the first and second signals.

13. The method of claim 9 further including generating a video signal in accordance with a result of the detecting step, and supplying the video signal to a display device.

* * * * *